United States Patent [19]

Pipkin

[11] 4,345,543

[45] Aug. 24, 1982

[54] APPARATUS FOR FORMING A COATING ON A SUBSTRATE

[75] Inventor: David J. Pipkin, Longmont, Colo.

[73] Assignee: International Business Machines Corporation, Armonk, N.Y.

[21] Appl. No.: 207,571

[22] Filed: Nov. 17, 1980

Related U.S. Application Data

[63] Continuation-in-part of Ser. No. 53,143, Jun. 27, 1979, abandoned, which is a continuation-in-part of Ser. No. 882,281, Feb. 23, 1978, abandoned.

[51] Int. Cl.³ .......... C05C 3/12; C05C 3/18

[52] U.S. Cl. .......... 118/106; 118/126; 118/407; 118/413

[58] Field of Search .......... 118/405, 407, 410, 411, 118/419, 420, 413, 415, 106, 126; 427/331, 355, 356, 358, 365, 370, 371; 425/377, 380, 224, 113

[56] References Cited

U.S. PATENT DOCUMENTS

| | | | |
|---|---|---|---|
| 62,044 | 2/1867 | Lowe | 118/106 |
| 1,632,760 | 6/1927 | Jones | 118/419 X |
| 1,972,457 | 9/1934 | O'Brien et al. | 118/413 |
| 2,249,088 | 7/1941 | Murray | 118/126 |
| 2,659,340 | 11/1953 | Zinn, Jr. | 118/202 |
| 3,063,868 | 11/1962 | Brandsma . | |
| 3,081,191 | 3/1963 | Smith et al. | 118/126 |
| 3,131,092 | 4/1964 | Coghill | 118/413 |
| 3,293,121 | 12/1966 | Martin | 162/358 |
| 3,334,792 | 8/1967 | DeVries et al. | 118/410 |
| 3,352,706 | 11/1967 | Alkoter | 118/123 |
| 3,544,669 | 12/1970 | Schock | 425/113 X |
| 3,575,134 | 4/1971 | Quint | 118/121 |
| 3,688,738 | 9/1972 | Eichler et al. | 118/62 |
| 3,729,376 | 4/1973 | Stevens | 162/306 |
| 3,749,054 | 7/1973 | Brezinski | 118/352 |
| 3,839,071 | 10/1974 | Borelli et al. | 118/637 X |
| 3,889,018 | 6/1975 | Quint | 118/121 |
| 3,903,541 | 9/1975 | Von Meister et al. | 118/410 |
| 3,908,590 | 6/1975 | Quint | 118/121 |
| 3,956,056 | 5/1976 | Boguslawski et al. | 425/113 X |
| 4,012,188 | 3/1977 | Lemelson | 425/224 X |
| 4,063,531 | 12/1977 | Zitzow | 118/122 |
| 4,076,864 | 2/1978 | Wallsten | 118/404 |
| 4,076,865 | 2/1978 | Wallsten | 118/404 |

FOREIGN PATENT DOCUMENTS

| | | |
|---|---|---|
| 2633111 | 2/1978 | Fed. Rep. of Germany . |
| 633950 | 12/1949 | United Kingdom . |

*Primary Examiner*—Ralph S. Kendall
*Attorney, Agent, or Firm*—Francis A. Sirr

[57] ABSTRACT

Method and apparatus for coating a moving web and for independently controlling the coating's width, thickness and uniformity of thickness along the length of the web. A back-up roller supports the moving web on a portion of the roller's periphery. A stationary and pliant smoothing film is positioned adjacent the exposed surface of the web which is supported by the back-up roller. A coating liquid is metered to the confluence of the web and the smoothing film, the metering rate being selected to produce a desired coating width. A pliant pressure generating means, in the form of a membrane or a force web, holds a length of the smoothing film against the moving web with a static force whose magnitude is selected in accordance with a desired coating thickness. The relative position of the back-up roller and the pressure generating means determines the length of coincidence of the moving web, the coating liquid, and stationary smoothing film. This length is selected, by virtue of selecting a relative position, to apply high hydrodynamic pressure to the coating liquid for at least a critical time interval, such that slight variation of this time interval does not produce appreciable variation in coating thickness along the length of the web, and lineal uniformity of coating thickness is thus achieved.

18 Claims, 7 Drawing Figures

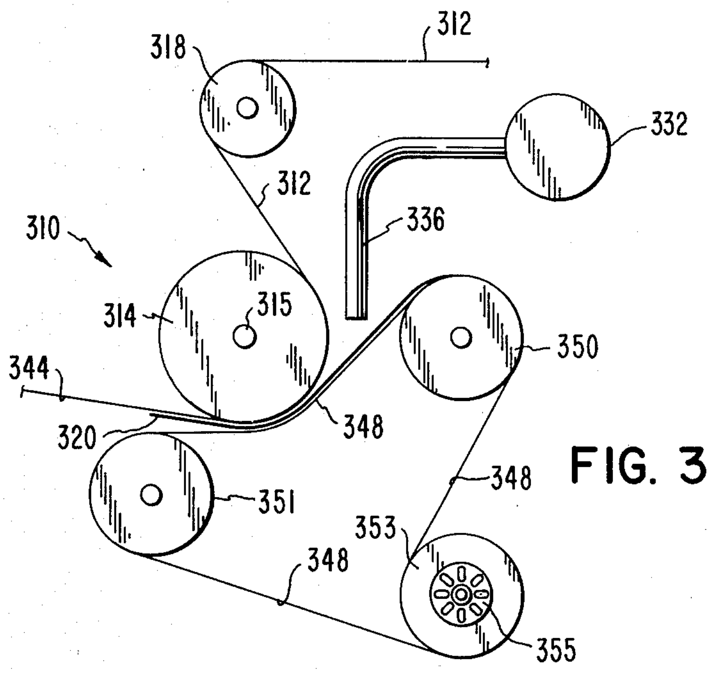
FIG. 3
FIG. 2
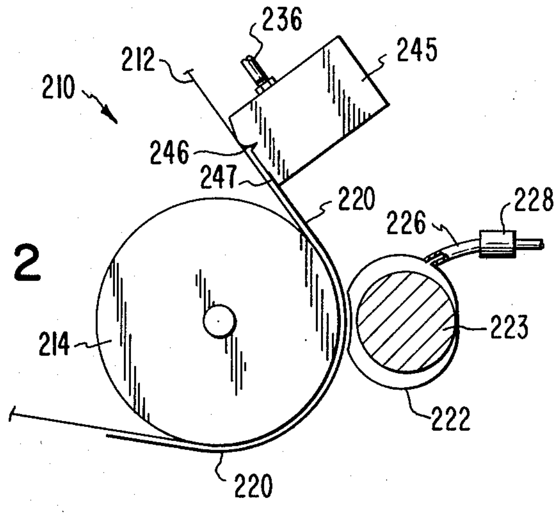

APPARATUS FOR FORMING A COATING ON A SUBSTRATE

DESCRIPTION

RELATED APPLICATIONS

This application is a continuation-in-part of copending application Ser. No. 053,143, filed June 27, 1979, and entitled "Method and Apparatus for Forming a Coating on a Substrate", now abandoned. Said application Ser. No. 053,143 is a continuation-in-part of application Ser. No. 882,281, filed Feb. 23, 1978, and entitled "Method and Apparatus for Forming a Coating on a Substrate", now abandoned.

BACKGROUND OF THE INVENTION

The present invention relates generally to coating a substrate or moving web with a coating fluid, and more particularly to a method and apparatus for coating a moving web by conducting the web to a metered source of coating fluid and urging a pliable smoothing film against the web by means of controllable pressure generating means, such as a variable tension force web or an inflatable membrane, the pressure generating means being adjacent to and downstream of the position at which the coating fluid is metered onto the web and/or the smoothing film.

There exists a great number of means and apparatus for coating liquids onto moving substrates. For instance, doctor knives may be employed to smooth and control the coating onto the substrate. Rollers may be employed to apply coatings either singularly, i.e., instances in which the roller passes through a reservoir of coating liquid and conducts the liquid directly to the substrate, or in combination such as in instances in which the substrate is passed between the nip of adjacent rollers to control coating. Coatings may be extruded in quite thin layers directly onto the substrate. The substrate may be dipped into a reservoir of coating liquid, either free-running as a web, or while being conducted around a roller, and air brushes or resilient wipers may be employed to remove the excess coating material from the substrate.

An early example of one wiping means is found in U.S. Pat. No. 62,044, issued Feb. 12, 1867. In this patent, a static cloth is stretched partially around a roller to generate a wiping action for bronze powder.

More recent U.S. Pat. No. 3,688,738, issued Sept. 5, 1972, discloses a coating means in which a substrate in the form of a web is conducted around a roller which is immersed in a coating fluid. A wiping film, which does not extend beyond the roller, is employed to remove excess coating fluid from the substrate and return it to the reservoir. In certain embodiments, an additional static film is employed to bear against the wiping membrane. However, it is generally not desirable to coat to the edge of the substrate. Excess coating material is flung from the edge as the web advances. Also, it is often useful to provide an uncoated margin. Thus, the simple apparatus of U.S. Pat. No. 3,688,738 is rather restricted as to the nature of the coatings produced and speed of operation. U.S. Pat. No. 3,352,706 is another example of a coating method in which excess coating material is applied to a web and a squeegee, which may be a flexible piece of plastic or rubber backed by resilient members such as stiffer sheets of plastic or rubber, is employed to remove the excess coating liquid from the web. Again, no provision is made for other than complete coating of the web with excess coating liquid. The patent is rather specific as to the need for a run-off path for the material.

Devices and methods for coating both sides of a web in essence utilize the above-mentioned concepts. For instance, according to U.S. Pat. No. 4,076,864, a web is guided through a bath of coating liquid with excess coating liquid removed by a doctor blade adjacent a backup roller. U.S. Pat. Nos. 3,575,134 and 3,908,590 are further examples of devices for coating both sides of a web, such as paper.

SUMMARY OF THE INVENTION

The present invention, which provides a heretofore unavailable combination of desirable features in the coating art, comprises an apparatus and method for coating in which a substrate in the form of a web is conducted through a controlled-length, high-hydrodynamic-pressure coating zone in which a controlled amount of a coating liquid is provided to the web.

The present invention finds special utility when coating the aforesaid web with a non-newtonian fluid, i.e., a fluid whose viscosity changes with rate of flow. Such fluids have also been described as thixotropic and pseudoplastic fluids. The method and apparatus of the present invention meters the fluid to the confluence of a moving web and a stationary smoothing film. As a result, the fluid is subjected to high shear force and its viscosity is reduced to thereby enable the coating of a thin fluid film onto the web. The present invention operates to subject the fluid to a high hydrodynamic pressure for a time interval which is determined by the speed of the web and the length of the coating zone, this length being measured in the direction of web travel.

A substantially static force generating means, such as a fluid-containing membrane or a force web, bears against a portion of the web which is supported by a backing means, such as a driven roller or a stationary guide plate. A stationary smoothing film is interposed between the force generating means and the moving web. Thus, a high-hydrodynamic-pressure coating zone is provided to the coating fluid at the zone of coincidence of the backing means, the moving web, the stationary smoothing film and the force generating means.

A metering zone is provided upstream of this coating zone, adjacent the confluence of the web and the smoothing film, such that a coating liquid can be metered to the coating zone. The rate at which liquid is metered determines the width of the web which is coated, width being measured transverse to the direction of web movement. Preferably, this metering is controlled as a function of web speed.

As the liquid enters the coating zone, it is subjected to high shear force, and a high hydrodynamic pressure is created in the liquid, by virtue of the influence of the moving web and the stationary smoothing film. The liquid's viscosity now decreases, and the web is coated to a thickness as determined by the magnitude of the static force provided to the coating zone by the force generating means, i.e., the higher the force, the thinner the coating. Thus, coating thickness is controlled by controlling the magnitude of this static force. Preferably, means such as an adjustable and regulated fluid pressure source is used with the membrane embodiment, whereas a controllable static torque motor is used with the force web embodiment, in order to control the magnitude of this static force.

The above-mentioned hydrodynamic pressure is maintained for the length of the coating zone. For any given web speed, the length of the coating zone directly translates into a residence time. In accordance with the present invention, this residence time is at least equal to a critical residence time. The term critical residence time is defined as that residence time which produces a coating thickness which does not appreciably change as residence time increases, all other factors such as web speed, for example, remaining constant. Preferably, a residence time operating point is chosen to be somewhat longer than the critical residence time, such that slight variation therefrom in either direction does not produce an appreciable change in coating thickness. As a result of such a residence time operating point, the web is coated to a uniform thickness along its traveling length. In the membrane embodiment of the present invention, the residence time is changed by moving the membrane relative to the web's backing support means, whereas in the force web embodiment the residence time is changed by changing the path of travel of the force web adjacent the backing means to thereby change the amount by which the force web engages or wraps the backing means.

Accordingly, an object of the present invention is to provide a new and improved method and apparatus for producing a quality coating to a moving web without relying upon precisely machined metal components.

Another object of the present invention is to provide a new and improved method and apparatus for coating in which the coating's width, thickness and uniformity may be readily controlled and varied.

Yet another object of the present invention is to provide a new and improved method and apparatus for coating in which the coating width may be conveniently controlled to be less than the entire width of the web.

Still another object of the present invention is to provide a new and improved method and apparatus for coating a moving web in which the coating liquid is utilized without recirculation of excess coating fluid to a coating fluid reservoir.

Yet still another object of the present invention is to provide a new and improved method and apparatus for coating a moving web in which the coating thickness and width may be readily controlled during on-line operation of the coating apparatus.

Still yet another object of the present invention is to provide a new and improved method and apparatus for coating at high speeds utilizing coating fluids under varying conditions including great variations in viscosities up to and including thixotropic materials, over substantial ranges of thickness including coatings thinner than those available with conventional gravure coating.

BRIEF DESCRIPTION OF THE DRAWINGS

In the drawings:

FIG. 2 is a view similar to that of FIG. 1 but illustrating a particularly preferred embodiment of the invention;

FIG. 3 is a simplified side view of yet a third embodiment of the invention;

DESCRIPTION OF THE PREFERRED EMBODIMENT

Figure 1:
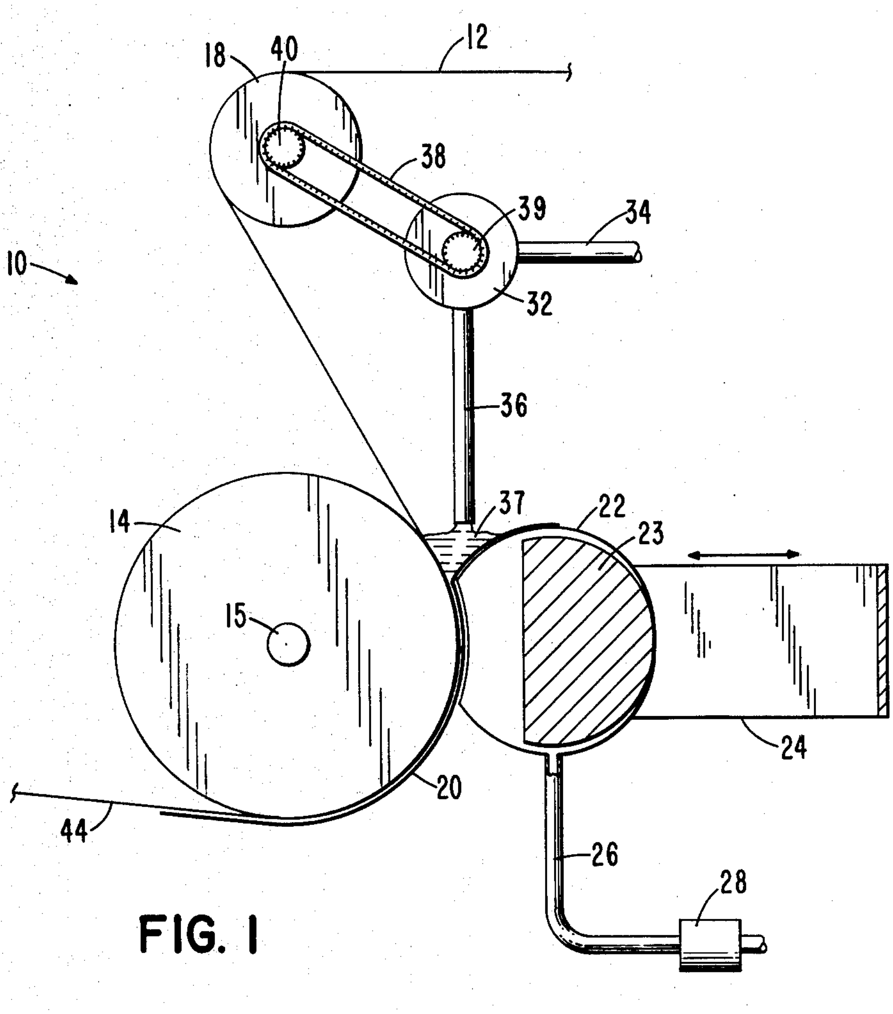
FIG. 1 is a simplified side view, partially in section, of a coating apparatus in accord with the instant invention.

Turning now to the drawings, a basic coating apparatus according to the instant invention is illustrated at FIG. 1 and generally designated by reference numeral 10. As shown in FIG. 1 coating apparatus 10 engages web 12 at back-up roller 14, preferably mounted for rotation at axis 15 and driven at line speed. Roller 14 is an exemplary 6 inches in diameter and 13.75 inches in axial length. Line speed is the speed at which web 12 travels as it passed down through coating zone or nip 14, 22. Guide roller 18 directs web 12 into contact with at least a substantial portion of the periphery of back-up roller 14.

Rollers 14 and 18 are conventional and in accord with normal coating practices for various substrates. For example, rollers 14 and 18 are of approximately equal axial length and are highly polished metal rollers. Web 12 is also, in most instances, a conventional substrate such as biaxially oriented polyethylene terephthalate (available under the trademark Mylar) acetates, polyolefins, or other such conventional polymeric films, paper, etc. Web 12 is an exemplary 0.0015 inch thick.

Figure 6:
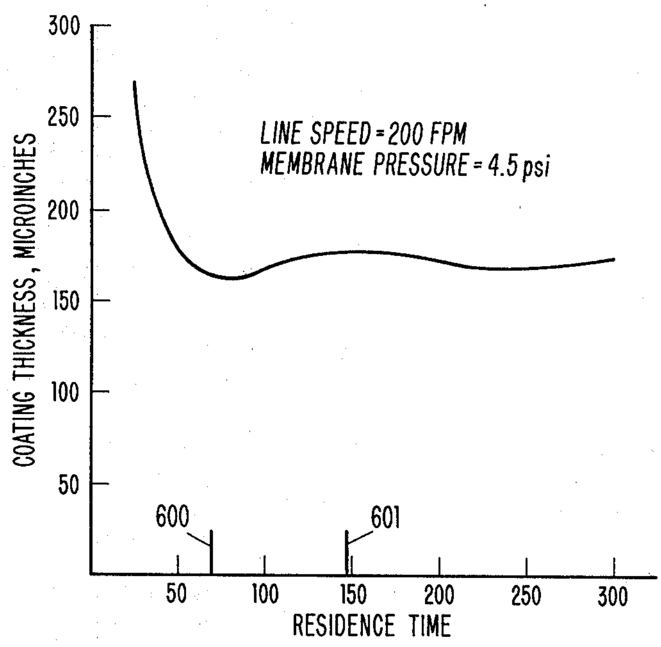
FIG. 6, which does not appear in said related applications, is a graph which depicts the manner in which the residence time operating point of the various embodiments of the present invention is selected so that slight variation in residence time of the web, as it passes through the coating zone does not produce changes in coating thickness as measured along the length of the web.

Smoothing film 20 is positioned in an essentially stationary, static fashion adjacent web 12 and a portion thereof extends around the periphery of back-up roller 14. Preferably smoothing film 20 extends over a substantial portion of the circumferential portion of web 12 in contact with back-up roller 14, but not substantially beyond such contact. Pressure generating means such as pliable membrane 22 carried on mandrel 23 and secured to support 24 urges smoothing film 20 into contact with web 12 with a predetermined static force which is a function of the internal pressure of membrane 22. Membrane 22 is tubular in shape, an exemplary 1.5 inches in diameter, is somewhat longer than film 20 is wide. The tubular axis of membrane 22 extends parallel to the axis of roller 14 for all positions of the membrane. Support 24 preferably allows for movement towards and away from back-up roller 14 to vary the circumferential conformance length of membrane 22 to roller 14. For a fixed line speed, the greater the length of membrane conformance, the longer will be the coating zone, as measured in the direction of web travel, and the longer will be the residence time of the web in the coating zone. As depicted in FIG. 6, once at least a critical residence time has been achieved for any given coating situation, variation in residence time, as may be expected in a manufacturing situation, does not produce appreciable variation in coating thickness along the length of the web.

Figure 7:
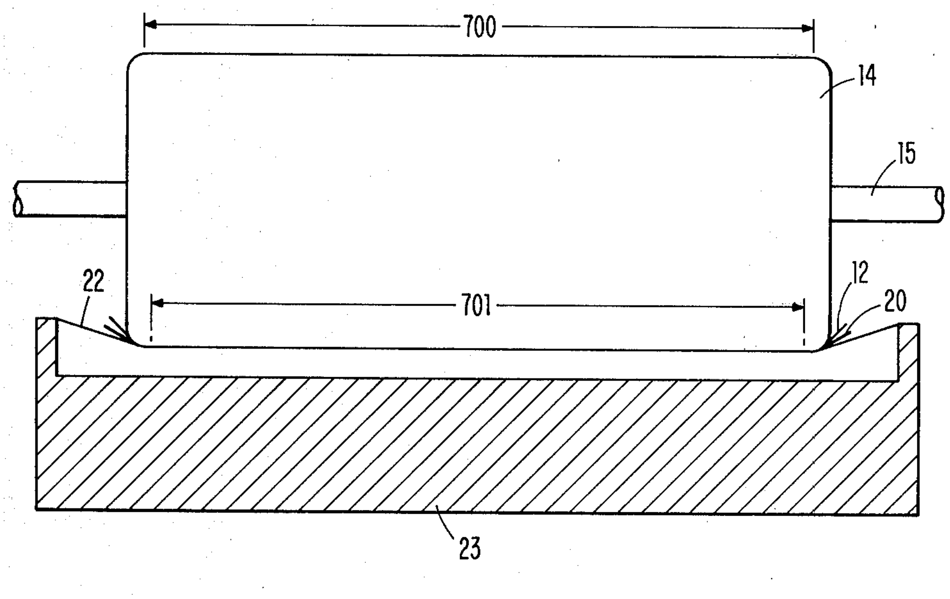
FIG. 7, which does not appear in said related applications, is a top view of the back-up support roller of FIGS. 1, 2 and 4, this figure showing the axial length of the roller as this length relates to the width of the membrane, smoothing film and moving web at about the center of the coating zone.

FIG. 7 is a top view of roller 14 and a section view of membrane 22, smoothing film 20 and web 12, for the purpose of showing the relative dimensions of these parts. As seen, the central portion 700 of roll 14 is a circular cylinder and is about 13.5 inches in axial length. The overall length of roller 14 is about 13.75 inches, the axial end surfaces being rounded, as shown. The portion 701 of the roll's circular cylinder is about 13.25 inches long and is the maximum area intended for use in coating web 12. Web 12 and smoothing film 20 are about 14.0 inches wide. The end edges of roller 14 are rounded to minimize stress at the annular ends of the roller's circular cylinder portion 701. Membrane 22 is about 16 inches long and extends beyond both side edges of smoothing film 20 and web 12.

Figure 4:
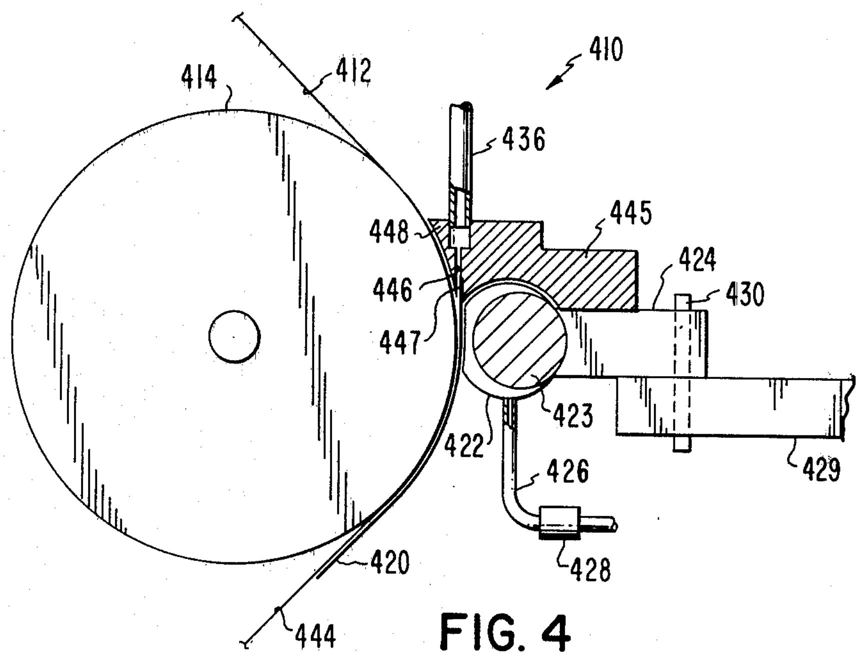
FIG. 4 is a simplified side view of a coating device similar to that illustrated to that in FIG. 2.

The above-described FIG. 7 relationship is exemplary of the similar relationship found in FIGS. 2 and 4.

Line 26 communicates with the interior of membrane 22 and also with pressure regulating means 28 to supply a fluid, preferably air, to the interior of membrane 22. Thus, by regulating the internal pressure of membrane 22, the pressure generating means urges smoothing film 20 into contact with web 12 at a desired static force which may be readily regulated by pressure regulating means 28.

Metering pump 32 provides liquid coating material from supply conduit 34 to feed conduit 36 at a predetermined rate to provide a reservoir 37 of the liquid coating material at the confluence of web 12 and smoothing film 20. Preferably, metering pump 32 is driven by, for instance, belt 38 connected to driven pulley 39 of metering pump 32 at one end, and drive pulley 40 of roller 18 at the other end of belt 38. Thus, the desired amount of liquid coating material is provided as a function of the speed of guide roller 18. However, under steady state operating conditions, a constant rate drive of metering pump 32 from an independent source (not shown) is of course workable.

Reservoir 37 of liquid coating material at the confluence of smoothing film 20 and web 18 provides a readily controllable coating on web 12 with, in essence, force generated by membrane 22 controlling the thickness of the coating and the rate of delivery by metering pump 32 controlling the width of the coating. The primary function of stationary smoothing film 20 is to provide an area of high shear force to the coating liquid, this in turn generating high hydrodynamic pressure, and to thus spread and smooth the liquid coating material to a uniform thickness along the web's length. As web 12 emerges from smoothing film 20, a coated substrate 44 is provided with liquid coating material evenly dispersed across the face of web 12 in a smooth and reproducible manner, and without a flow of surplus liquid coating material at the end of smoothing film 20.

Since the coating nip or zone comprises a moving member 12 and a stationary member 22, the coating fluid at the confluence of these two members is subjected to high shear force, and in turn high hydrodynamic pressure, for the entire time of the material's residence in nip 14, 22. This residence time is a function of the line speed of web 12 and the adjusted position of membrane 22 toward or away from roller 14. More specifically, for a given position of membrane 22, the residence time decreases as the line speed increases; and for a given line speed, the residence time decreases as membrane 22 is moved away from roller 14, and increases as member is moved toward roller 14.

FIG. 6 shows the effect of a change in coating thickness as a function of a change in residence time, with the line speed and the pressure within membrane 22 remaining constant. Since this graph is a generalized teaching, it is merely representative. However, it is apparent that once a critical residence time is reached, such as at about operating point 600, the coating thickness no longer changes significantly as residence time increases. An ideal operating point is at about 601. This residence time is substantially that of the critical residence time, and it yet allows some variation in residence time to occur with no appreciable change in coating thickness. An increase in the pressure within membrane 22 will not change residence time operating point 601. However, a change in this pressure will produce a change in coating thickness.

The aforesaid critical residence time provided by the FIG. 1 embodiment is also provided by the embodiments of FIGS. 2 through 5 hereof.

FIG. 6 can also be used to explain a unique self-compensating effect which is achieved by the combination of roller 14 and membrane 22. As will be appreciated, roller 14 may not be a perfect circular cylinder. However, any slight eccentricity in the roller's surface merely results in momentary and slight excursion of operating point 601 to the left and/or right, with an accompanying slight excursion in residence time, but with no appreciabl change in coating thickness.

Various changes and advantages of the above-described method and apparatus will be apparent to those skilled in the art. For instance, a number of outlet conduits 36 could be provided across the face of web 12 to provide a plurality of strip coatings on web 12 which would be convenient for later splitting into individual coated sections. The size of reservoir 37 is readily controlled by the rate of metering to avoid spreading of the liquid coating material to the edge of the web thereby facilitating high speed operation with desired margins free of excess coating material at the edge of back-up roller 14. Thixotropic liquid coating materials can readily be maintained in a flowable state by the shearing action of metering pump 32 and the shearing action of web 12 at reservoir 37, as previously described.

Another embodiment of a coating apparatus according to the instant invention is illustrated in FIG. 2 and generally designated 210. As shown, the pressure generating means is in the form of membrane 222 attached, as illustrated, to cylindrical mandrel 223. Also, as shown in FIG. 2, supply conduit 236 is connected to die 245 in place of the simple outlet of supply conduit 36 of FIG. 1. Outlet slot 246 of extrusion die 245 is positioned to provide the liquid coating material onto web 212 in such a manner as to isolate the liquid coating material from exposure to air for even a brief period. Though illustrated with exaggerated spacing for clarity, web 212 interfaces with extrusion die 245 to effectively seal the contact surface of web 212 from the external environment. Thus, liquid coating material extruded through slot 246 is contained between web 212 and the face of extrusion die 245. Smoothing film 220 is preferably attached to extrusion die 245 at indent 247 and serves to spread and smooth the liquid coating material as membrane 222, carried on mandrel 223, bears against back-up roller 214. Line 226 and regulating means 228 function as discussed above with reference to FIG. 1. Thus, coating apparatus 210 is similar to coating apparatus 10 but provides coating without exposing the coating material to air prior to completion of the coating process.

Still another embodiment of a coating apparatus according to the instant invention is illustrated at FIG. 3 and generally designated by the reference numeral 310. Coating apparatus 310 is similar to the embodiments of FIGS. 1 and 2 except for the nature of the pressure generating means.

In the place of membrane 22 of FIG. 1, force web 348 is positioned in an essentially static, i.e. stationary, fashion by force web guide rollers 350 and 351 to bear in the direction of back-up roller 314 over a portion of the surface thereof in contact with web 312. Force web 348 terminates at tension roller 353 and is attached thereto in such a manner that torque applied to tension roller 353 increases the tension on force web 348 and accordingly the pressure with which force web 348 is urged toward back-up roller 314. Means for varying the torque applied to tension roller 353, such as static torque motor 355, are provided to facilitate convenient adjustment of the tension of force web 348. Force web 348 may be produced of one of a number of thin flexible materials, such as polyester, i.e., polyethylene terephthalate, rubber, other polymeric films, metals, or even paper.

Smoothing film 320 is interposed in a static fashion between force web 348 and web 312 at the portion thereof in contact with back-up roller 314, though smoothing film 320 may of course extend beyond the point of contact with back-up roller 314. As illistrated, smoothing film 320 is mounted at force web guide roller 350, though it is contemplated that other fixed supports would serve equally well. Unless extrusion die 245, as shown in FIG. 2, is employed, web 312 generally contacts back-up roller 314 prior to contacting smoothing film 320. This condition is necessary in order that the liquid coating material may be applied to the confluence of web 312 and smoothing film 320 through, as illustrated, supply conduit 336. As described above, coating materials are carefully metered through supply conduit 336. Again, in the preferred instance, metering pump 332 is driven synchronously with web 312 such that an increase in the linear speed of web 312 is accompanied by an increase output at metering pump 332. However, in instances in which web 312 advances at a substantially constant rate, simplified metering means such as a source of coating material applying a head pressure to a simple adjustable valve is operable. Other variations in the coating liquid supply system include use of an extrusion die or a manifold (not shown) with multiple outlet orifices adapted to more evenly spread the coating liquid across web 312 to provide either a single orifice or multiple outlet orifices adapted to more evenly spread the coating liquid across web 312 to provide either a single coated area or multiple coated areas. Under certain operating conditions, and particularly where smoothing film 320 is initially vertical, the coating liquid may be applied directly to smoothing film 320 adjacent the intersection thereof with web 312. As with all embodiments of the invention, coating liquid is metered in amounts promptly utilized with none being returned to a supply reservoir or removed from the web. Thus, problems attendant to recycling coating liquid, i.e., coagulation, contamination, aeration, etc. are entirely avoided.

In operation, coating apparatus 10 or 310 provides a high static pressure area at which web 12 or 312 is urged against back-up roller 14 or 314 by force generating means such as membrane 20 or web 348 acting through smoothing film 20 or 320. By adjusting the pressure of membrane 22 or the tension on force web 348, and accordingly the force with which smoothing film 20 or 320 bears against web 12 or 312, the thickness of the coating liquid passing through such area is readily adjusted, and given a fixed supply rate of coating liquid, the width of coating is concurrently controlled. By increasing the supply rate of coating liquid, the width of the coating can be readily increased; and, by varying the pressure in membrane 20 or the tension of force web 348, the thickness can be easily adjusted. Under production conditions, these parameters can readily be adjusted by controlling the output of metering pump 32 or 332 or varying either pressure regulating means 28 or the torque applied by static torque motor 355, which is run in a stalled mode, to tension roller 353, as the case may be.

Another embodiment of the instant invention, which is quite similar to that of FIG. 2 but preferred in most instances, is illustrated at FIG. 4, whereat the coating apparatus is generally designated 410. As illustrated, web 412 is supported on back-up roller 414 engages smoothing film 420, in a manner similar to that described above. Inflatable membrane 422 carried on mandrel 423 at support 424 communicates with line 426 and pressure regulating means 428 whereby the fluid pressure within membrane 422 may be controlled. Support 424 is carried on mount 429 by pivot 430 thereby enabling membrane 422 to rotate around pivot 430 and squarely engage back-up roller 414 with smoothing film 420 therebetween. As discussed above, liquid coating material in a metered amount appropriate for the linear speed of web 412 provided through conduit 436 to coating die 445. Such material is provided at extrusion outlet slot 446 substantially at the confluence of back-up roller 414 carrying web 412, and smoothing film 420. As illustrated, smoothing film 420 is attached to extrusion die 445 at attachment area 447. While the metered liquid coating material is protected from the atmosphere by smoothing film 420 adjacent outlet slot 446, shoe member 448, which is formed as part of extrusion die 445 as illustrated, closely fits adjacent to but spaced from web 412 to minimize the possibility of contamination of coating liquid material before the coating is complete. In such a manner, coated web 444 may be formed while protecting the liquid coating material from the atmosphere and contamination, without recycle or waste of coating material and with accurate control over both the width of the coating, as a function of the rate of metering, and the thickness of the coating, as a function of the force applied by pressure membrane 422.

Figure 5:
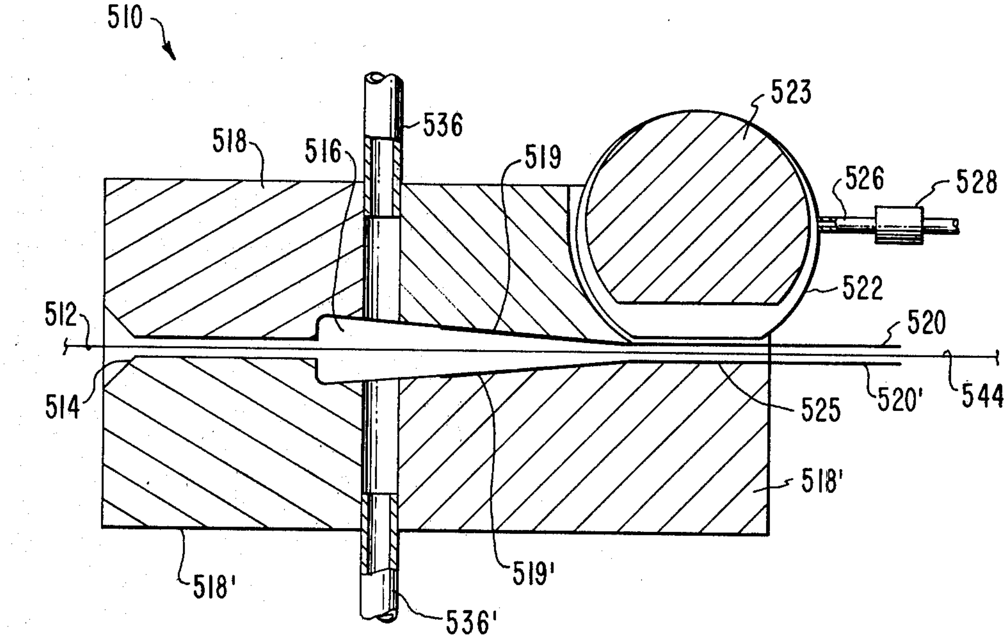
FIG. 5 is a simplified sectioned side view of an embodiment of an invention suitable for coating both sides of a moving web with the same or different coating liquids.

A particularly versatile embodiment of the coating apparatus according to the instant invention is illustrated in FIG. 5, and generally designated 510. As shown, coating apparatus 510 is in the form of a dual side coating device with web 512 entering inlet slot 514, which fits relatively closely adjacent web 512. Enlarged coating throat 516 is defined in die block 518 with converging downstream walls 519. For purposes of discussion, it will be noted that die block 518 is substantially symmetrical (except for the outlet end), and accordingly the upper portion and related features will be designated 518, while the lower portions will be designated 518'. Converging walls 520 and 520' of coating throat 516 communicate with upper conduit inlet 536 and lower conduit inlet 536'. In this manner, two independent streams of coating material may be metered to opposite sides of web 512. Upper smoothing film 520, and lower smoothing film 520' are attached to walls 519 and 519', respectively, and extend past membrane 522 carried on mandrel 523 and bearing against backing means 525 defined on die block 518'. Line 526, and pressure regulating means 528, communicate with the interior of membrane 522, thus accommodating variations in pressure within membrane 522.

From the above description of coating apparatus 510, it will be apparent that an upper coating may be formed on web 512 by liquid coating material metered at conduit inlet 536, and an independent lower coating may be formed by liquid coating material metered at conduit inlet 536', to produce a coated web 544 which may be coated on both sides with the same material, or with different materials on opposite sides. By providing different rates of metering of liquid coating materials to the upper and lower portions of web 512, coatings of different widths may be produced on opposite sides thereof. Also, by varying the rheological properties of the independent streams of liquid coating material, coatings of different thicknesses are obtained on opposite sides of web 512. A dynamic seal is accomplished at inlet slot 514 and the adjacent opening defined in die block 518 in that moving web 512 presents a resistance to flow of liquid coating material toward inlet slot 514, thus effectively countering the pressure difference between coating throat 516 and the atmosphere at inlet slot 514. This is accomplished without contacting web 512 with other than liquid coating material.

From the above description, it will be apparent that the coating apparatus according to the instant invention, in its various embodiments, provides for a unique coating mechanism wherein liquid coating material is metered at the rate of consumption by the coating operation to a zone at or adjacent to the area at which the smoothing film is urged toward the backing means by the pressure generating means. Thus, the width of the coating is determined by the rate of metering, and the thickness of the coating is determined by the static force applied to the smoothing film. Very uniform thicknesses, on the order of between plus or minus 5 microinches to plus or minus 10 microinches have been obtained with a thin flexible membrane providing the static force. The hydrodynamic pressure in the coating fluid, caused by the membrane's static force zone, provides for very smooth coatings and the enclosed, immediately utilized feed supply of liquid coating material avoids problems attributable to drying and contamination of the coating material. Thin coatings, i.e., less than 100 microinches, have been obtained with high line speeds on the order of 450 feet per minute. Despite providing for smooth, thin coatings, the compliance of the smoothing film and the pressure generating means permits passage of web splices and particles of coating material. A particle trapped and held by the smoothing means would of course cause a continuing defect. In the embodiment providing for coating of both sdes of the web, different fluids may be coated on different sides and different thicknesses and/or widths may be obtained on opposite sides of the web. The smoothing film is readily replaced and constitutes the only component of the coating apparatus which contacts the liquid coating material, and the only component which bears closely upon the web in the coating zone. Rather than relying upon a precisely machined part subject to wear, a carefully controlled high static force and high hydrodynamic pressure acting on the coating fluid for at least a critical time period provides hydrodynamic pressures in the coating fluid that conveniently and economically control the coating. However, more fundamentally, the instant invention provides a method entirely avoiding the prior art concept of applying excess coating material to the entire surface of a web, and then scraping or squeegeeing the excess from the web for recycling, or to be wasted.

The objectives of the aforesaid embodiments are generally to produce a desired and controlled coating thickness, of a desired and controlled width (i.e. of a width measured normal to the direction of web travel), and of continuously uniform thickness measured both normal to the direction of web travel and along the length of the web. Assume the web's line speed to be a desired constant. The coating's thickness is controlled by the magnitude of the static force with which the smoothing flap is urged or loaded against the web. The width of the coating is controlled by the rate at which coating fluid is metered to the confluence of the web and the smoothing flap upstream of the coating zone. Uniform coating thickness transverse to the direction of web movement is achieved by the accuracy of mounting the membrane or force web, by the compliant nature of the membrane or force web along the dimension of the backing support means transverse to web movement, and in the case of the FIG. 4 embodiment additionally by the compliant mounting of the membrane. Uniform coating thickness along the length of the web is achieved by the high-shear-force, high hydrodynamic pressure, coating zone whose coating residence time is at least the critical residence time from which slight time variation does not create appreciable variation in coating thickness.

In all embodiments of the present invention, the moving web is guided through the coating zone in a fixed-position plane. The smoothing film and the pressure generating means, be it a membrane or a force web, both occupy parallel planes. This parallel relationship insures that whatever coating thickness is desired, the coating will be uniform transverse to the direction of web movement. In the membrane embodiments of the present invention, this parallel relationship is somewhat self-adjusting due to the pliant nature of the tubular shaped membrane. In FIG. 4, this parallel relationship is additionally maintained by the self-adjusting mounting of the membrane relative pivot 430. In the force web embodiment of FIG. 3, this parallel relationship is established by maintaining the axis of rollers 350 and 351 parallel to the axis of roller 314.

Though but a limited number of preferred embodiments of the present invention have been illustrated and described, it is anticipated that various changes and modifications will be apparent to those skilled in the art, and that such changes may be made without departing from the scope of the invention as defined by the following claims.

What is claimed is:

1. Apparatus for coating a moving web with a coating liquid, the apparatus comprising:

backing support means adapted to engage one surface of the moving web so as to guide the web in a fixed-position path of travel;

at least one length of stationary smoothing film mounted so as to facilitate the positioning of a portion thereof adjacent the opposite surface of the web;

means to meter a coating liquid through at least one orifice which is positioned adjacent the confluence of the smoothing film and web;

pliant pressure generating means positioned to bear against said film in a manner to position said film adjacent the web and to provide both a static force and a high-hydrodynamic-pressure coating zone between the web and said film, compliance of said pressure generating means to said backing support providing a coating zone whose length, in the direction of web movement, applies said hydrodynamic pressure to the liquid for at least a critical time interval which is sufficient to insure uniform coating thickness to the length of the web;

means to adjust the relative position of said pressure generating means and said support means, in order to control the length of compliance of said pressure generating means to said backing support, to thereby control said critical time interval; and means to adjust the force with which said pressure generating means bears against said film, to thereby control the magnitude of said static force and high-hydrodynamic-pressure;

whereby a moving web may be carried through said coating zone with said film bearing thereagainst for at least said critical time interval which is controllable as a function of the relative position of said pressure generating means and said backing support means.

2. Apparatus for coating a moving web as set forth in claim 1 wherein said metering means meters the coating liquid at a predetermined rate, said rate being selected to produce a predetermined width of coated web transverse to the direction of web movement.

3. Apparatus for coating a moving web as set forth in claim 1, wherein said metering means meters the coating liquid at a predetermined rate, said rate being selected to produce a predetermined width of coated web transverse to the direction of web movement, and wherein said means to adjust the force with which said pressure generating means bears against said smoothing film produces a static force which is selected to produce a predetermined thickness coating to the web.

4. Apparatus for coating a moving web as set forth in claim 1, 2 or 3 in which the backing support means is a back-up roller which is driven to match the speed of the moving web, said roller being journaled around an axis of rotation and adapted to support the moving web at a portion of the periphery of the back-up roller.

5. Apparatus for coating a moving web as set forth in claim 1, 2 or 3 in which the backing support means is a planar surface over which the web moves and towards which the pressure generating means bears, with said film being positioned between the planar surface and the pressure generating means.

6. Apparatus for coating a moving web as set forth in claim 1, 2 or 3 in which the pressure generating means comprises a closed pliable membrane positioned adjacent to and bearing against the smoothing film, and in which said means to adjust said force includes a source of fluid under pressure to fill the membrane.

7. Apparatus for coating a moving web as set forth in claim 1, 2 or 3 in which the coating liquid is thixotropic, and in which the smoothing film is a pliant material extending on both sides of the portion thereof which is interposed between the pressure generating means and the backing support means.

8. Apparatus for coating a moving web as set forth in claim 1 in which the pressure generating means comprises a closed pliable membrane positioned adjacent to and bearing against the smoothing film, and in which said means to adjust said force includes a pneumatic fluid source and a pressure regulator to selectively control the pressure within the membrane.

9. Apparatus for coating a moving web as set forth in claim 1 wherein said metering means meters the coating liquid at a predetermined rate selected to produce a predetermined width of coated web transverse to the direction of web movement, said metering means comprising a metering pump operably connected to the moving web to be driven at a rate which is a function of the rate of web movement.

10. Apparatus for coating a moving web as set forth in claim 9 in which said orifice is an elongated slot in an extrusion die and the web contacts the face of the extrusion die which includes the elongated slot.

11. Apparatus for coating a moving web as set forth in claim 1 in which the backing support means is a back-up roller journaled around an axis of rotation and adapted to support the moving web at a portion of the periphery of the back-up roller, and means to rotate the back-up roller.

12. Apparatus for coating a moving web as set forth in claim 11 including an approach roller rotatably mounted around an axis parallel to the axis of said back-up roller and positioned such that a tangent mutual both to the guide roller and back-up roller, and said smoothing film defines said confluence, with said orifice being positioned adjacent such confluence.

13. Apparatus for coating a moving web with a coating liquid, the apparatus comprising:

a back-up roller journaled about an axis of rotation;

means to guide a moving web into contact and around at least a portion of the periphery of said back-up roller;

a closed pliable membrane having a generally tubular shape and an axis, means adjustably mounting said membrane with its axis generally parallel to the axis of said back-up roller such that said membrane bears toward and exerts a static force upon the back-up roller at a portion thereof which is contacted by the web;

a length of smoothing film fixedly mounted and interposed between the membrane and the back-up roller;

means to adjustably position the axis of said membrane relative the axis of said back-up roller, the selected relative position being such as to achieve at least a critical residence time of the web in a high-hydrodynamic-pressure region whereat the stationary smoothing film is held against the moving web, the critical residence time insuring substantially uniform coating thickness to the length of the web;

means to adjust the static force with which said membrane urges said smoothing film toward said back-up roller, to thereby control the thickness of the coating; and means including an orifice operable to meter the coating liquid to a position adjacent the back-up roller and at the confluence of the web and the smoothing film.

14. Apparatus for coating a moving web as set forth in claim 13 wherein said means to adjust the static force includes means communicating with the interior of the membrane for providing fluid under a preselected but variable pressure to the interior of the membrane, the selected pressure being a function of a desired static force and coating thickness.

15. Apparatus for coating a moving web as set forth in claim 13 wherein said means to adjust the static force includes means communicating with the interior of the membrane for providing fluid under a preselected but variable pressure to the interior of the membrane, the selected pressure being a function of a desired static force and coating thickness, and wherein said means to meter the coating liquid operates to meter the liquid at a predetermined rate, the predetermined rate being a function of a desired width of coating as measured transverse to the direction of web movement.

16. Apparatus for coating a moving web as set forth in claims 13, 14 or 15 in which the coating liquid is thixotropic, and in which said orifice comprises an elongated slot in an extrusion die which is positioned to contact the moving web adjacent the confluence of the web and the smoothing film.

17. Apparatus for coating a moving web as set forth in claims 14 or 15 wherein the means for providing fluid under pressure to the interior of said membrane comprises a pneumatic pressure source and a pneumatic pressure regulator.

18. Apparatus for coating a moving web as set forth in claim 15 including a metering pump operable to meter liquid in accordance with the rate of web movement.

* * * * *

UNITED STATES PATENT AND TRADEMARK OFFICE
CERTIFICATE OF CORRECTION

PATENT NO. : 4,345,543

DATED : Aug. 24, 1982

INVENTOR(S) : David J. Pipkin

It is certified that error appears in the above—identified patent and that said Letters Patent is hereby corrected as shown below:

The title page should be deleted to appear as per attached title page.

Signed and Sealed this

*Seventeenth* Day of *April 1984*

[SEAL]

*Attest:*

GERALD J. MOSSINGHOFF

*Attesting Officer* *Commissioner of Patents and Trademarks*

United States Patent [19]
Pipkin

[11] 4,345,543
[45] Aug. 24, 1982

[54] APPARATUS FOR FORMING A COATING ON A SUBSTRATE

[75] Inventor: David J. Pipkin, Longmont, Colo.

[73] Assignee: International Business Machines Corporation, Armonk, N.Y.

[21] Appl. No.: 207,571

[22] Filed: Nov. 17, 1980

Related U.S. Application Data

[63] Continuation-in-part of Ser. No. 53,143, Jun. 27, 1979, abandoned, which is a continuation-in-part of Ser. No. 882,281, Feb. 23, 1978, abandoned.

[51] Int. Cl.[3] ........ C05C 3/12; C05C 3/18
[52] U.S. Cl. ........ 118/106; 118/126; 118/407; 118/413
[58] Field of Search ........ 118/405, 407, 410, 411, 118/419, 420, 413, 415, 106, 126; 427/331, 355, 356, 358, 365, 370, 371; 425/377, 380, 224, 113

[56] References Cited

U.S. PATENT DOCUMENTS

| | | | |
|---|---|---|---|
| 62,044 | 2/1867 | Lowe | 118/106 |
| 1,632,760 | 6/1927 | Jones | 118/419 X |
| 1,972,457 | 9/1934 | O'Brien et al. | 118/413 |
| 2,249,088 | 7/1941 | Murray | 118/126 |
| 2,659,340 | 11/1953 | Zinn, Jr. | 118/202 |
| 3,063,868 | 11/1962 | Brandsma . | |
| 3,081,191 | 3/1963 | Smith et al. | 118/126 |
| 3,131,092 | 4/1964 | Coghill | 118/413 |
| 3,293,121 | 12/1966 | Martin | 162/358 |
| 3,334,792 | 8/1967 | DeVries et al. | 118/410 |
| 3,352,706 | 11/1967 | Alkoter | 118/123 |
| 3,544,669 | 12/1970 | Schock | 425/113 X |
| 3,575,134 | 4/1971 | Quint | 118/121 |
| 3,688,738 | 9/1972 | Eichler et al. | 118/62 |
| 3,729,376 | 4/1973 | Stevens | 162/306 |
| 3,749,054 | 7/1973 | Brezinski | 118/352 |
| 3,839,071 | 10/1974 | Borelli et al. | 118/637 X |
| 3,889,018 | 6/1975 | Quint | 118/121 |
| 3,903,541 | 9/1975 | Von Meister et al. | 118/410 |
| 3,908,590 | 6/1975 | Quint | 118/121 |
| 3,956,056 | 5/1976 | Boguslawski et al. | 425/113 X |
| 4,012,188 | 3/1977 | Lemelson | 425/224 X |
| 4,063,531 | 12/1977 | Zitzow | 118/122 |
| 4,076,864 | 2/1978 | Wallsten | 118/404 |
| 4,076,865 | 2/1978 | Wallsten | 118/404 |

FOREIGN PATENT DOCUMENTS

| | | |
|---|---|---|
| 2633111 | 2/1978 | Fed. Rep. of Germany . |
| 633950 | 12/1949 | United Kingdom . |

*Primary Examiner*—Ralph S. Kendall
*Attorney, Agent, or Firm*—Francis A. Sirr

[57] ABSTRACT

Method and apparatus for coating a moving web and for independently controlling the coating's width, thickness and uniformity of thickness along the length of the web. A back-up roller supports the moving web on a portion of the roller's periphery. A stationary and pliant smoothing film is positioned adjacent the exposed surface of the web which is supported by the back-up roller. A coating liquid is metered to the confluence of the web and the smoothing film, the metering rate being selected to produce a desired coating width. A pliant pressure generating means, in the form of a membrane or a force web, holds a length of the smoothing film against the moving web with a static force whose magnitude is selected in accordance with a desired coating thickness. The relative position of the back-up roller and the pressure generating means determines the length of coincidence of the moving web, the coating liquid, and stationary smoothing film. This length is selected, by virtue of selecting a relative position, to apply high hydrodynamic pressure to the coating liquid for at least a critical time interval, such that slight variation of this time interval does not produce appreciable variation in coating thickness along the length of the web, and lineal uniformity of coating thickness is thus achieved.

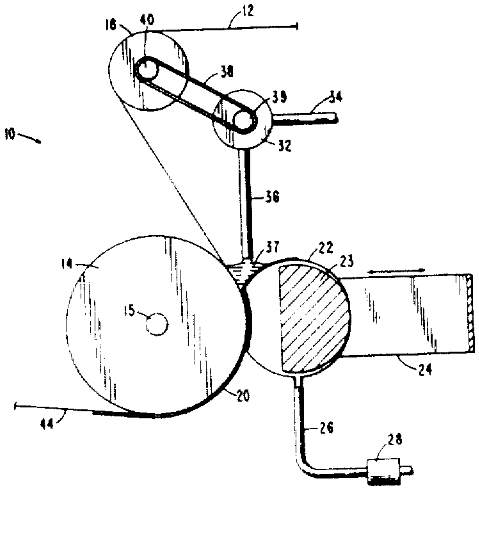

18 Claims, 7 Drawing Figures